Jan. 21, 1969  S. J. WEEMS ET AL  3,423,286
PRESSURE SUPPRESSING ARRANGEMENT FOR USE WITH A NUCLEAR REACTOR
Filed Feb. 18, 1966  Sheet 3 of 4
FIG. 10.
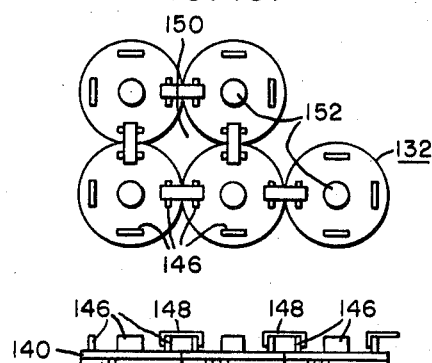
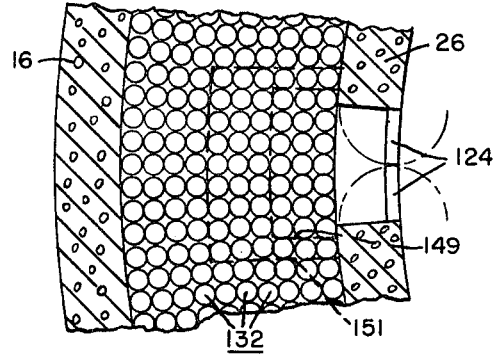
FIG. 8.
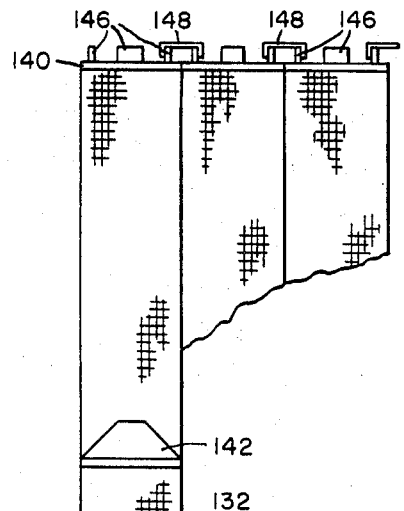
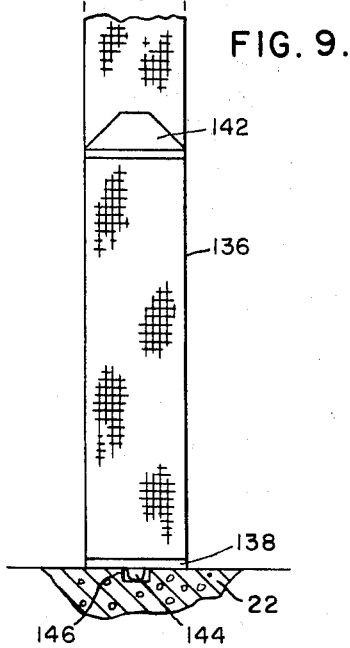
FIG. 9.
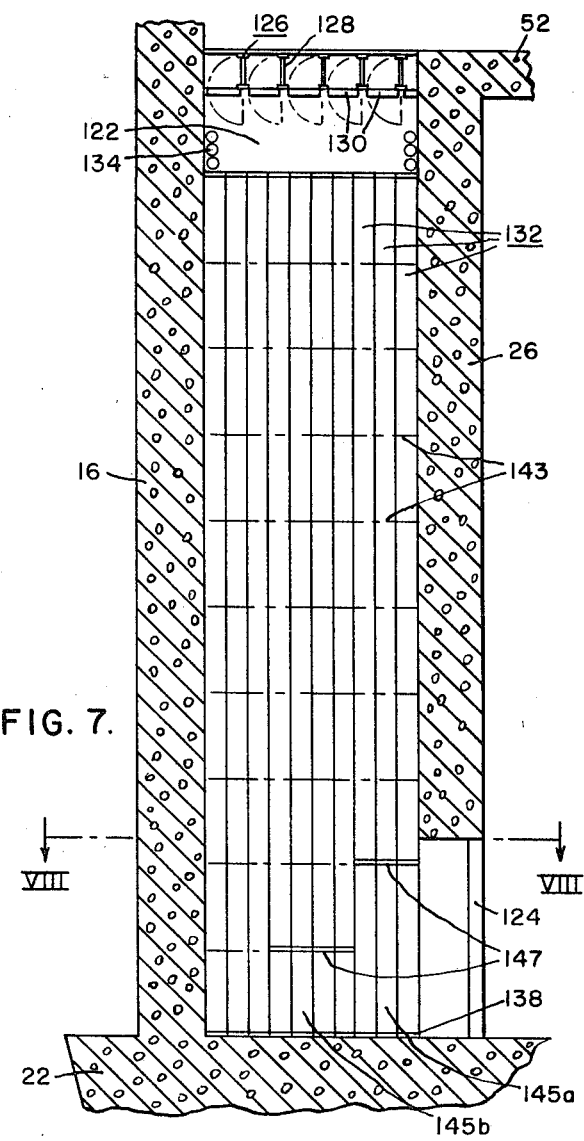
FIG. 7.

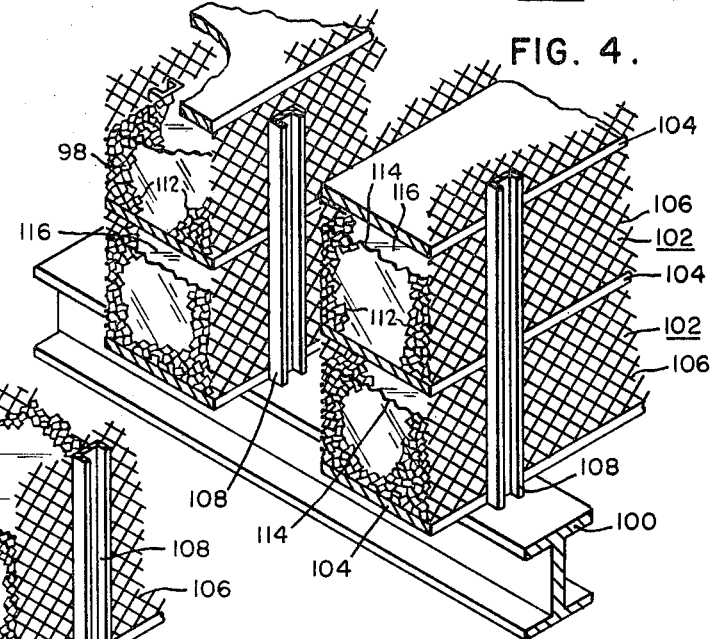
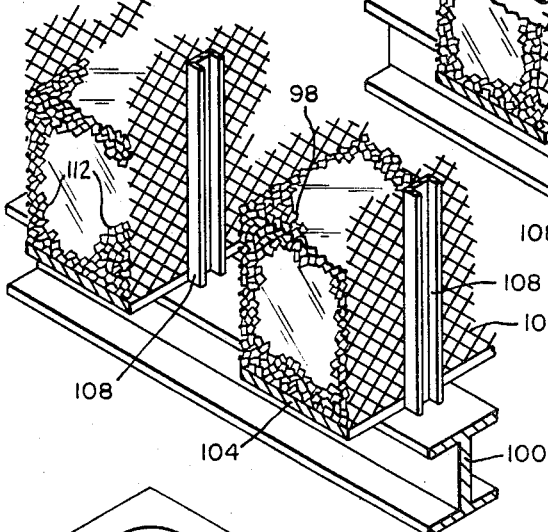
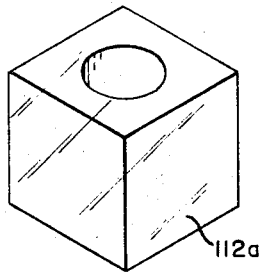
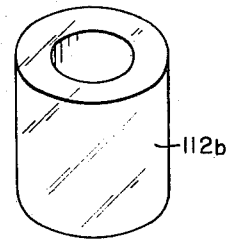
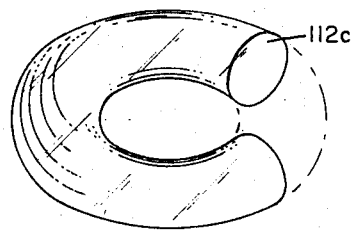
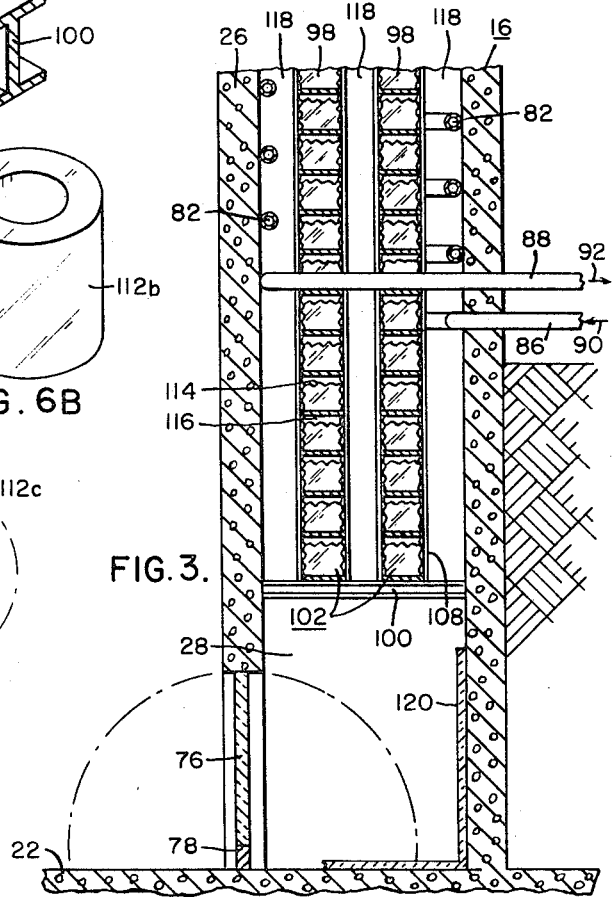

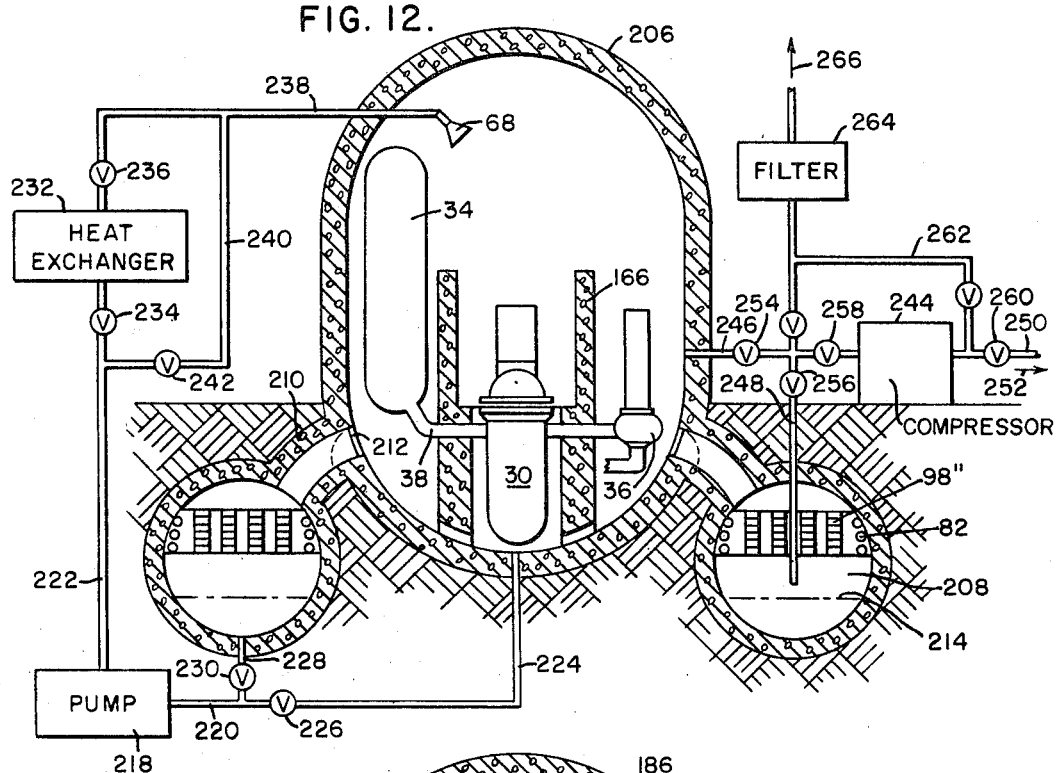
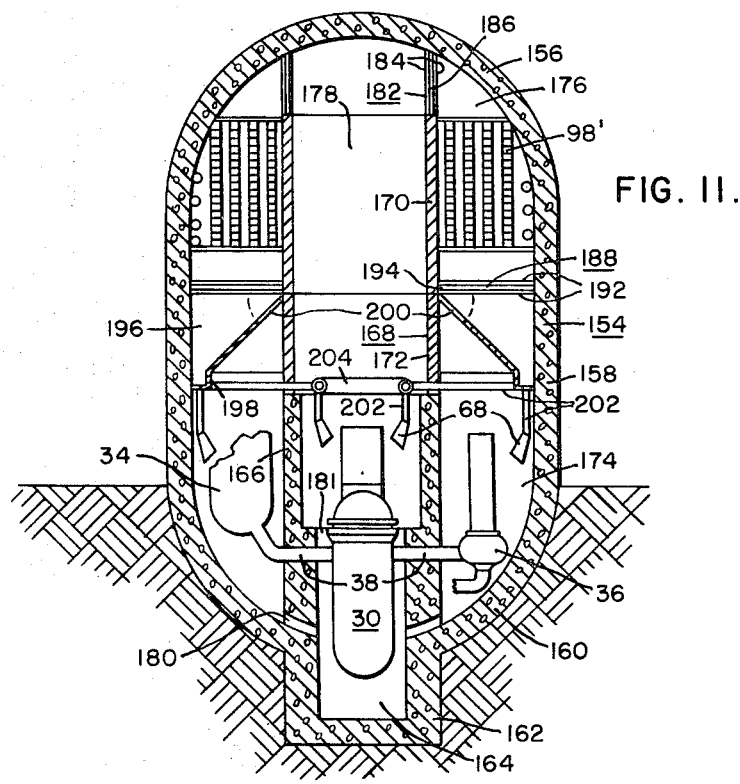

United States Patent Office 3,423,286
Patented Jan. 21, 1969

3,423,286
PRESSURE SUPPRESSING ARRANGEMENT FOR USE WITH A NUCLEAR REACTOR
Sterling J. Weems, Chevy Chase, John A. Hinds, Bethesda, and I. Harry Mandil, University Park, Md., assignors to Westinghouse Electric Corporation, Pittsburgh, Pa., a corporation of Pennsylvania
Filed Feb. 18, 1966, Ser. No. 528,639
U.S. Cl. 176—37          25 Claims
Int. Cl. G21c 19/00

ABSTRACT OF THE DISCLOSURE

A nuclear reactor containment is provided wherein energy releasable from a nuclear reactor in the unlikely event of a failure in the integrity thereof is absorbed by a solid which melts at a temperature lower than the condensation temperature of the escaping vapor. In certain examples the solid is housed in cooled compartments which are exposed to the reactor system during accident conditions.

---

This invention relates in general to a new and improved system for suppressing the pressure released to the ambient from a high temperature, pressurized fluid system occasioned by a system rupture or by the operation of suitable pressure relief means coupled to the system. More particularly, this invention is directed to a pressure suppressing arrangement for use with a pressurized, high temperature fluid system disposed within a containment means or enclosure, for example a nuclear reactor system containing a pressurized, high temperature coolant which releases condensable vapors to the atmosphere in the event of a system rupture.

In the exemplary application of the invention, wherein the pressure suppressing arrangement is used with a nuclear reactor enclosure containing a nuclear reactor system utilizing a high pressure, high temperature coolant and/or moderator, such as water, a system rupture pressurizes the surrounding reactor container by the generation of a vapor, such as steam, produced by the flashing of the pressurized water leaking into the reactor container.

Present day design practice requires that the reactor portion of a nuclear power plant be contained within a sealed container to prevent the escape of radioactive material to the atmosphere in case of an accident or rupture in the primary or reactor portion of the plant. The sealed container is strong enough to withstand the pressure developed within the container following an accident, in which a portion of the water flashes to steam. The reactor container also prevents the spread of radioactive material that the flashing water escaping from the reactor portion of the plant may contain.

The design pressure for the reactor container is based on an accident which assumes a rupture in the primary or reactor coolant system of sufficient magnitude to result in the release of virtually all of the available stored thermal energy in the coolant which generates a large quantity of steam or other vapor.

As is known, reactor containers are expensive and represent a substantial portion of the total nuclear plant cost. Because of their size, the reactor containers have a major effect on the overall plant design. Therefore, a major reduction in the reactor container design pressure and/or size results in substantial savings in plant cost together with an increase in plant safety since a lower pressure lasting for a short time reduces the possibility of leakage of radioactive material from the reactor container.

Accordingly, it is the general object of this invention to provide a novel pressure suppressing arrangement for a pressurizable enclosure which may be subjected to increased pressurization from a release of a fluid from a pressurized fluid system contained within the enclosure.

It is a more particular object of this invention to provide a novel pressure suppressing arrangement for an enclosure which contains a nuclear reactor system.

Another object of this invention is to reduce substantially the design pressure and/or size requirements of a reactor container of a nuclear power plant.

Still another object of this invention is to provide a pressure suppressing arrangement which is always ready for immediate action whenever an accident might occur and which does not rely on any external services or on operator control in order to function immediately upon the occurrence of such an accident in a coolant system of the nuclear plant.

Still another object of this invention is to provide means utilizing the latent heat of a material for condensing the condensable vapors that may be released within the reactor enclosure.

Briefly, the present invention accomplishes the above cited objects by providing a quantity of stored material which absorbs a thermal energy release by means of its latent heat, such as the heat of fusion (melting). In addition a portion of the thermal energy release is absorbed by the subsequent temperature rise of the liquid formed from the aforementioned stored material. For example, a refrigerated compartment is provided with the reactor container and, if desired, is open at the top. Access doors are provided in the lower and upper portions of the compartment, if a closed compartment is desired. However, a refrigerated compartment without doors may also be provided with an opening at one end thereof. A quantity of energy absorbing material is disposed within the compartment with a plurality of flow passages extending through the material. The stored material, for example ice, is kept in a solid state by means of a refrigeration unit, which maintains the temperature in the compartment below the melting temperature of the stored material.

In case of an accident, such as a rupture in a coolant system, the high presure, high temperature fluid, for example light water, escapes from the coolant system into the reactor container. The escaping high pressure, high temperature water immediately flashes into vapor and begins to build up a pressure within the reactor container. The pressure buildup then causes the doors of the refrigerated compartment to open and allows the vapor to flow into the compartment. If the refrigerated compartment has an opening in lieu of doors, the escaping vapor flows through the opening into the compartment. The vapor then flows through the flow passages within the ice and is condensed by the ice. Therefore, the heat of fusion of the melting ice absorbs the thermal energy of the coolant resulting in a substantial reduction in the pressure build-up within the reactor container. Furthermore, the cooling coils which maintain the ice in a solid state may be used as a post accident cooling system to remove long term thermal energy from sources such as reactor decay heat.

The performance of the pressure suppressing system can be further improved by mixing the melted condenser material, such as water, with the uncondensed higher temperature vapor. This is accomplished by permitting the melted material either to mix with or to fall through the high temperature vapor whereby the resulting increase in temperature of the melted material causes the condensation of the vapor and thus improves the efficiency of the pressure suppressing system.

An additional feature of this invention is the use of a spray system within the reactor container in combination with the melting material. This is accomplished by collecting the condensate and the melted material in a well at the bottom of the reactor container. The liquid mixture of condensate and melted material is pumped into the spray system and sprayed within the reactor container and through the escaping vapor. A unique feature of this mechanical spray system is that the inadvertent actuation of the spray pumps forming a part of the spray system does not result in liquid damage to the plant, since a liquid supply is not available unless a thermal energy release has occurred to melt the ice.

Still another feature of this invention is to provide a vacuum within the reactor container and the compartment to decrease the container initial pressure and to improve the heat transfer between the vapor and the ice by the elimination of any air film over the ice surface which would somewhat inhibit the heat transfer.

These and other objects and advantages of the present invention will become more apparent when considered in view of the following detailed description and drawings, in which:

FIG. 3 is an enlarged fragmentary view showing the lower right-hand portion of FIG. 1;

FIG. 4 is an enlarged fragmentary and perspective view of the lower portion of the stored material shown in FIG. 3;

FIG. 5 is a perspective view similar to FIG. 4 but showing a different embodiment for containing the stored material;

FIGS. 6A, 6B and 6C are perspective views showing three different shapes of stored material;

FIG. 7 is an enlarged vertical sectional view showing another embodiment of the annular portion of the pressure suppressing arrangement illustrated in FIG. 1;

FIG. 8 is a fragmentary cross sectional view of FIG. 7 and is taken along reference line VIII—VIII thereof;

FIG. 9 is an enlarged vertical view of a portion of FIG. 7 and primarily illustrates the construction of one of the modules shown in FIG. 7;

FIG. 10 is a plan view of FIG. 9; and

FIGS. 11 and 12 are vertical sectional views of two additional embodiments of the present invention.

Figures 1, 2:
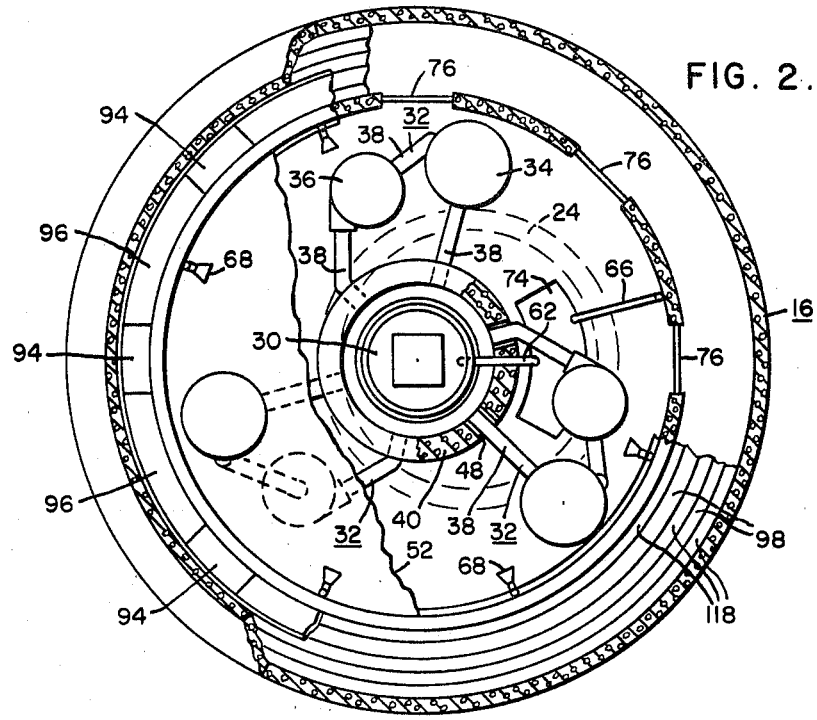
FIGURE 1 is a vertical sectional view of one embodiment of the present invention.
FIG. 2 is a cross sectional view with parts removed to show different levels of the pressure suppressing arrangement shown in FIG. 1 and is taken generally along reference line II—II thereof.

Referring now to FIGS. 1 through 4 of the drawings, an illustrative example of a pressure suppressing system for use with a nuclear power plant is depicted therein. A reactor container 16 comprises a hemispherical head portion 18, a cylindrically shaped vertical wall portion 20, a flat annular floor 22, and a cylindrically shaped downward extension 24 disposed off-center of the floor 22 as shown in FIG. 2 and forming a well 25.

Spaced inwardly of the reactor container 16 is a vertical, secondary shield or wall 26, which is annularly shaped and extends vertically from the floor 22 into the upper region of the space enclosed by the reactor container 16. The secondary shield 26 cooperates with reactor container 16 to form a condenser compartment 28 therebetween.

The nuclear reactor plant is located within the space enclosed by the secondary shield 26 and comprises a sealed reactor vessel 30 containing a reactor core and in this example three primary loops 32. Each primary loop 32 is hermetically enclosed and comprises a heat exchanger such as a steam generator 34, a reactor or primary coolant pump 36, and primary coolant conduits 38. In operation, the primary coolant is heated within the reactor vessel 30, flows from the reactor to the steam generator 34 where it gives up a portion of its heat to a secondary fluid, flows from the steam generator 34 to the reactor pump 36, and then returns to the reactor vessel 30 where the coolant is again heated by the reactor core and the cycle repeated. A pressurizer (not shown) is also coupled to one of the loops 32 in order to maintain a certain range of pressure within the sealed primary system.

Spaced inwardly from the secondary shield 26 and surrounding the reactor vessel 30 is a primary shield 40, which extends vertically from the floor 22 to a point a short distance above the control rod drive mechanisms which extend upwardly from the reactor vessel 30 and are indicated generally by reference character 42. The primary shield 40 encloses a reactor compartment 44 having a reactor opening 46 through which the bottom portion of the reactor vessel 30 extends and has conduit openings 48 through which conduits 38 extend. An annularly shaped flexible seal 49 extends from the reactor vessel 30 to the primary shield 40 so as to subdivide the reactor compartment into an upper or refueling portion 44a and a lower portion 44b. The primary shield 40 also cooperates with the secondary shield 26 to form an annularly shaped loop compartment 50 within which are disposed the steam generators 34 and the reactor pumps 36. An upper floor or deck 52 extends horizontally across the top of the loop compartment 50. Steam generator openings 54 are provided in the deck 52 to allow a portion of each steam generator 34 to pass therethrough and also to allow radial and axial expansion of the steam generator 34. A deck compartment 56 is formed in the upper portion of the reactor container 16 and is located above the deck 52.

Referring now to the well 25 there is disposed therein an emergency sump pump 58 and a spray sump pump 60. A conduit 62 communicably couples the emergency sump pump 58 to the reactor 30, and a normally closed, remote operated valve 64 is disposed in conduit 62 near the pump 58. A conduit 66 communicably couples spray sump pump 60 to a plurality of spray heads 68 which are disposed in loop compartment 50 and deck compartment 56. If desired, additional spray heads 68 can be located within the reactor compartment 44 and also in the upper region of deck compartment 56. A normally open, remote operated valve 70 is disposed in conduit 66 near the spray sump pump 60. In addition, a normally closed bypass valve arrangement 72 couples conduits 62 and 66 down stream of valves 64 and 70, so that either pump 58 or 60 can be used to pump a liquid through either of conduits 62 and 66 by the proper manipulation of valves 64, 70 and 72. Both pumps 58 and 60 can also be made self-actuating by any well known control system, such as the use of a float control system wherein a pump can be actuated when the liquid level reaches a certain elevation and then shut off when the liquid level drops to a second predetermined elevation. Of course, it is also understood that the drive units and the valve arrangement for the pumps may be located above the floor 22 instead of in the well 25.

Referring now to the condenser compartment 28, there are provided a plurality of insulated doors 76 in the bottom portion of the secondary shield 26. The insulated doors 76 are illustrated in this embodiment as two-way operating doors which can open inwardly or outwardly of condenser compartment 28. In this example the doors 76 have hinges 78 (FIG. 3) at the bottom thereof. The hinges 78 are located a short distance above the floor 22. The hinges 78, of course, can also be provided along one vertical edge of each door 76 so as to permit the door to swing laterally instead of vertically as shown in FIG. 3. Refrigerant or cooling coils 82 are provided along both vertical walls of the condenser compartment 28. The cooling coils extend around the outer periphery of the secondary shield 26 and also extend around the inner periphery of the reactor container 16. The cooling coils 82 are communicably coupled to a refrigerant unit 84 by an inlet conduit 86 and an outlet conduit 88 with the inlet flow 90 and the outlet flow 92 indicated in FIG. 3. A plurality of insulated doors 94 are also provided at the top of condenser compartment 28. The doors 94 extend from the secondary shield 26 to the reactor container 16 and are in a normally closed position. The doors 94 are hinged in a similar manner to the doors 76 and are also two-way operating doors. The doors 76 and 94 are so constructed that when they are in a closed position a small differential force, for example one half p.s.i. across the doors is sufficient to open them. This can be accomplished for example, by the use of static friction when the doors are in a closed position or by the use of latches or by the use of a suitable rupture means. The upper insulated doors 94 are disposed between solid structural partitions 96 so as to enclose completely the condenser compartment 28. If desired, the condenser compartment 28 may also be hermetically sealed or may be formed to permit a small amount of fluid leakage between the condenser compartment 28 and the remainder of the compartments within the reactor container 16 during normal plant operation. If it is desired, however, upper doors 94 may be omitted thereby leaving an opening at the top of condenser compartment 28.

Within the condenser compartment 28 there is disposed a quantity of solid material 98 formed from a substance having a relatively large heat of fusion. Desirably the solid material 98 has a relatively low freezing point as compared to the condensation point of the reactor or primary coolant. A particularly suitable solid material 98 for use with a primary coolant formed from light water is the solid form of the coolant, i.e. ice. Sufficient ice is disposed within the condenser compartment to substantially fill the condenser compartment 28. The lower extremity of the ice 98 is supported at a location a short distance above the lower doors 76 by a structural support such as I-beams 100, which are in turn secured to the secondary shield 26 and to the reactor container 16.

The ice 98 is sub-divided into discrete packets by means of annular trays 102 (FIGS. 3 and 4). The trays 102 comprise an annular steel plate 104 having, for example, wire mesh sides 106 with one-quarter inch openings through the wire mesh. The trays 102 are stacked one above the other and are laterally supported by vertically rising channels 108 (FIG. 4). The vertical channels 108, in turn, are laterally supported by a horizontal steel structural framework 110 formed in this example from horizontal channels 110 secured to the secondary shield 26 and to the reactor container 16. Furthermore, each tray 102 is individually supported by the vertical channels 108. This is accomplished by securing the bottom plate 104 of the tray 102 to the vertical channel 108 by any known means, such as welding the plate 104 to the channel 108, bolting the plate 104 to the channel 108, or providing an angle clip underneath each plate 104 and securing the angle clip to the channel 108. The ice 98 in each of the trays 102 may be in the form of a solid mass or cast blocks with or without openings therethrough. In this example the ice mass 98 is formed from a plurality of ice pellets 112 which are loaded into each tray 102 to a level 114 terminating a short distance below each plate 104 in the adjacent tray 102 thereby forming horizontal flow passages 116 between adjacent trays 102. It is desired to choose a pellet shape which has a maximum surface area for heat transfer purposes. Thus pellets 112 may have one of several configurations, for example an irregular shape, one of the configurations shown in FIGS. 6A, 6B and 6C, a solid cube, or a solid ball. In FIG. 6A the ice pellet 112$a$ is a one inch cube with a 9/16 inch dimeter hole through the center thereof. In FIG. 6B the ice pellet 112$b$ is a one inch diameter cylinder having a one inch height and a 9/16 inch hole longitudinally through the cylinder. In FIG. 6C the ice pellet 112$c$ has a toroidal shape having a half inch diameter cross section with an outer diameter of two inches and a one inch inner diameter. Vertical flow passages 118 are also maintained on either side of the trays 102. Insulation 120 may be provided on the inner walls of the condenser compartment 28, as partially shown in FIG. 3, to reduce the heat transfer rate from the other compartments within the reactor container 16 into the condenser compartment 28, and also to reduce the heat transfer from the atmosphere outside the reactor container 16 into the condenser compartment 28. The insulation 120, of course, is excluded from the portions of the condenser compartment 28 occupied by the lower insulated doors 76 and the upper insulated doors 94. Furthermore insulation 120 may be omitted when the reactor container 16 and the secondary shield 26 are sufficiently thick.

In FIG. 5 another embodiment of the ice bed 98 is shown which is similar to the configuration shown in FIG. 4 but has all of the plates 104 eliminated except for a single bottom plate 104 at the bottom of the ice bed 98. In this configuration only vertical flow passages 118 are provided as the ice pellets 112 extend in a solid bed from top to bottom within the wire mesh 106. It is also apparent that in FIG. 5 large cast blocks of ice can be used in lieu of the ice pellets, and the blocks of ice can be stacked one upon the other within the wire mesh 106. In fact, the wire mesh 106 may be omitted and an additional number of vertical channels 108 provided for the lateral support of the blocks of ice.

In FIG. 5 the ice pellets 112 are loaded from the top of the ice bed 98. In FIG. 4 each tray 102 is loaded before the next higher tray 102 is installed. Another suitable loading arrangement is the provision of openings at the top of the wire mesh 106 for loading purposes.

Operation

During normal operation of the nuclear reactor system the condenser compartment 28 is maintained as a closed compartment separate from the remainder of the interior of the reactor container 16. The insulated doors 76 and 94 are in a closed position, and the amount of fluid leakage into the condenser compartment 28 is maintained at a minimum or completely eliminated. The condenser compartment 28 is refrigerated by the refrigerating unit 84 and the cooling coils 82 to prevent any melting of the ice bed 98. The emergency sump pump 58 and the spray sump pump 60 are at a standby condition as the well 25 is dry. Valve 70 is maintained in an open position with valves 64 and 72 being closed. The pumps 58 and 60 are automatically controlled so that they will begin operation as soon as a predetermined level of liquid is reached in the well 25. Valve 64 will also automatically open when pump 58 begins operation.

In a loss of coolant accident it is assumed that a rupture at some point in the primary coolant conduits 38, for example in the conduit within the lower reactor compartment 44$b$. The high pressure, high temperature primary coolant, which in this example is pressurized water, flows from the rupture in the primary conduit 38 into the lower reactor compartment 44$b$. Upon entering the lower reactor compartment 44$b$ some of the pressurized high temperature water flashes into steam. The steam then flows into the loop compartment 50 by flowing through openings, such as conduit openings 48 in the primary shield 40 and/or through the reactor opening 46, through the well 25, and through the loop opening 74. As the steam accumulates in the loop compartment 50, a pressure is built up in the loop compartment 50 which begins to produce a differential pressure between the loop compartment 50 and the condenser compartment 28. The build-up of a small amount of differential pressure, for example one half p.s.i., between the loop compartment 50 and the condenser compartment 28 will then cause the lower doors 76 to open inwardly into the condenser compartment 28. The steam then flows into the condenser compartment 28 and flows upwardly through flow passages 118 and laterally through flow passages 116 in the ice bed 98 thereby coming in contact with the ice pellets 112 in the ice bed 98. The ice in absorbing the thermal energy in the steam partially melts and concurrently condenses the steam to reduce the pressure in the reactor container 16. In addition, the liquid created by the melting ice passes through and mixes with the rising steam absorbing its thermal energy and causing additional condensation of the steam. Thus, the ice and the steam are maintained in good heat transfer relationship at all times.

A liquid mixture of water and condensate falls to the bottom of the condenser compartment 28, flows through the openings provided by the lower doors 76, and flows through the loop opening 74 into the well 25.

The non-condensable fluids, such as the air mixed with the steam, flow into the loop compartment, then upwardly through the condenser compartment 28 into the upper portion thereof. As the non-condensable fluids collect in the upper portion of the condenser compartment 28, a pressure build-up occurs which causes the upper doors 94 to open outwardly into the deck compartment 56. As in the case of the lower doors 76, only a small differential pressure across the upper doors 94 causes them to open. The non-condensable fluids are then forced into the deck compartment 56, which serves as a storage space. It is to be noted, however, that as the non-condensables flow through the condenser compartment 28, they are cooled by the ice bed 98 and by the falling water from the melting ice bed 98, thereby further reducing the pressure buildup within the reactor container 16. Since most of the thermal energy release is absorbed at a fast rate (approximately that of the thermal release rate) by the ice bed 98 and by the water formed by the melting ice, the size and/or pressure rating of the reactor container 16 can be greatly reduced and savings in the cost thereof are achieved. It is also to be noted that the cooling coils 82 also assist in condensing the steam resulting in a further decrease in the pressure buildup within the reactor container 16.

Returning now to the well 25, the liquid mixture of melted ice and condensate collects in the well. When the liquid mixture reaches a predetermined level in the well, the emergency sump pump 58 and spray sump pump 60 are actuated automatically by suitable means (not shown). The emergency sump pump 58 pumps the liquid mixture into the reactor vessel to prevent a melt down of the core within the reactor vessel 30. The spray sump pump 60 concurrently pumps the liquid mixture through conduits 66 to the spray heads 68. The liquid mixture of water and condensate is then sprayed within the reactor container 16 to condensate steam and to cool non-condensable fluids. If desired, spray heads may also be located within the reactor compartment 44 and in the upper portion of the deck compartment 56. However, the primary purpose of the spray from the spray heads 68 is to reduce the pressure within reactor container 16 after the initial pressure surge has been suppressed by the ice bed 98. If a rupture in the conduits 38 occurs within the loop compartment 50, the steam flows directly through the lower doors 76 into the condenser compartment 28 with the thermal energy being absorbed from the steam in the manner previously described.

If desired, the deck 52 may be eliminated. In this case when a rupture occurs in the conduit 38 within loop compartment 50, the steam enters through either the lower doors 76 or the upper doors 94 or simultaneously through both groups of doors 76 and 94. Eventually, a unidirectional flow is established downwardly through the condenser compartment 28 by natural or thermal circulation.

Referring now to FIGS. 7 to 10 of the drawings, another embodiment of the condenser compartment 28 is shown and like reference numerals are used for like parts previously described. In this example, an annularly shaped condenser compartment 122 is disposed between reactor container 16 and secondary shield 26. The condenser compartment 122 extends upwardly from the floor 22 to the same level as the deck 52. A plurality of insulated doors 124 are provided in the bottom portion of the secondary shield 26. The doors 124 are two way operating doors which can open inwardly or outwardly of the condenser compartment 122. Hinges (not shown) are provided along one vertical edge of each door to permit the doors 124 to swing laterally as shown in FIG. 8. At the top of the condenser compartment 122, structural support 126 is formed by a plurality of I-beams 128 and a grating mounted thereon. Upper insulated doors 130 are supported by the I-beams 128. The doors 130 are also two way operating doors and open inwardly into the condenser compartment 122 and outwardly between the I-beams 128 as shown in FIG. 7. Doors 124 and 130 are normally maintained in a closed position and open when a small differential pressure is applied across the doors.

Within the condenser compartment 122 there are a plurality of cylindrically shaped modules 132, which extend upwardly from the floor 22 to a level a short distance below the upper doors 130. The modules 132 are vertically disposed side by side in the condenser compartment 122. Cooling coils 134 are provided along both vertical walls of the condenser compartment 122 between the top of the modules 132 and the upper doors 130. The cooling coils 134 are coupled to the refrigerator unit 84 (FIG. 1) by inlet and outlet conduits (not shown).

Referring now specifically to FIGS. 9 and 10, the peripheral wall 136 of the cylindrically shaped module 132 is formed from a porous material, for example ¼-inch hardware cloth. A bottom plate 138 and a top plate 140 are secured to the ends of the peripheral wall 136 by suitable means such as tabs (not shown). In this example, the module 132 may be approximately 1 foot in diameter and about 42 feet in length. A plurality of truncated, conically shaped retainer plates 142 are disposed in tandem along the length of the module 132. The retainer plates 142 are secured to the peripheral wall 136 in a suitable manner (not shown) and desirably are spaced from one another by approximately 4 feet. The conical portion of each retainer plate 142 extends upwardly and has a central opening at its smaller end which in this example may be of a 3-inch diameter. The bottom plate 138 has a hemispherically shaped nose piece 144 which extends downwardly from the module 132 and is received in a recess 146 within the concrete floor 22 for positioning the module 132 within the condenser compartment 122. The top plate 140 has a plurality of upwardly extending handles 146 which may be formed integrally with the top plate 140 by a suitable means such as by stamping. Adjacent modules 132 are held together at the top by clips 148. Each clip 148 is placed over two adjacent handles 146 on two adjacent modules 132. Each cluster of four modules 132 forms a flow passage 150 therebetween. An ice fill opening 152 is also formed in the top plate 140 and is desirably formed of the same size as and in longitudinal alignment with the central openings in the retainer plates 142. In order to fill an ice module 132 with ice pellets 112 (FIG. 6), the grating above the module 132 to be filled is removed and the upper doors 130 are opened. A hose (not shown) is then inserted through the ice fill hole 152 and through the central opening in each retainer plate 142 until the hose reaches the lower portion of the module 132. Ice pellets 112 are then loaded through the hose into the module 132; and as the ice pellets 112 fill the module, the hose is lifted upwardly through the module 132. Therefore, in this example of invention, the body of ice in module 132 fills the annular space between the periphery of the central opening and the peripheral wall 136 and the central space formed by the central openings in plates 142. The ice body in the annular space extends vertically between adjacent retainer plates 142 and is supported by the lower retainer plate 142, while the ice body in the central region extends the full length of module 132 and is supported solely by the bottom plate 138. Thus, the retainer plates 142, by separating the annular space into tandem regions, serve to prevent the major portion of the ice pellets 112 in module 132 from packing together into a single solid mass. In addition, by extending the conically shaped portion of the retainer plate 42 upwardly, advantage is taken of the angle of repose of the ice which makes it possible to load more ice into the module 132 by filling the conical portion of each retainer plate 142.

Returning now to FIG. 7, the dot-dash lines 143 generally represent the locations of retainer plates 142. Ice has been eliminated from the lower portions 145a and 145b of some of the modules 132 by providing solid plates 147 at the bottom of the ice container therein. Therefore, an offset portion, which is void of ice, is provided opposite the lower doors 124 to provide for a better distribution of steam flow through the condenser compartment 122. FIG. 8 shows more specifically the modules 132 which have lower portions void of ice, in that dot-dash line 149 encloses those modules which have the two lowermost sections 145a void of ice and dot-dash line 151 encloses those modules which have only the lowermost section 145b void of ice.

Referring now to FIG. 11 of the drawings, another embodiment of this invention is shown. In this example, a reactor container 154 is vertically disposed and has a hemispherical head portion 156, a cylindrical wall portion 158, and a hemispherically shaped lower portion 160 having a cylindrically shaped downward extension 162 which forms a well 164 at the bottom of the reactor container 154. An annular reactor shield 166 extends upwardly into the lower portion of the reactor container 154 from the downward extension 162. A cylindrically shaped inner wall 168 extends upwardly into the upper portion of the reactor container 154 from the top of the reactor shield 166 and has an upper portion 170 and a lower portion 172. The reactor shield 166 and the lower inner wall portion 172 cooperate with the reactor container 154 to form an annular loop compartment 174, and the upper inner wall portion 170 cooperates with the reactor container 154 to form an annular condenser compartment 176. The reactor shield 166 and the inner wall 168 enclose a space within the inner portion of the reactor container 154 which forms a reactor compartment 178. A plurality of flow passages 180 extend through the reactor shield 166 and communicably couple the loop compartment 174 with the reactor compartment 178 and the well 164.

A portion of the nuclear reactor system is also shown, wherein the reactor vessel 30 is disposed within the reactor shield 166 with its lower portion extending into the well 164, and the steam generator 34 and reactor pump 36 are disposed within the loop compartment 174. In this embodiment an annular flow passage 181 is provided between the reactor vessel 30 and the reactor shield 166. An upper partition 182 extends downwardly from the top of the reactor container 154 to the top of the inner wall 168 which is spaced a short distance away from the reactor container 154. The upper partition 182 comprises two membranes 184 with an inner space 186 therebetween. Each membrane 184 is formed from a suitable non-porous material, such as plastic, and maintains air or a vacuum in the space 186 for insulating purposes. The upper partition 182 is secured to the reactor container 154 and to the top of the inner wall 168. Each of the membranes 184 has a weakened portion adjacent the inner wall 168; therefore, when a differential pressure is produced across the upper partition 182, the weakened portion breaks away from the inner wall 168 by rupturing while the top portion of each membrane 182 remains stationary. Thus, the upper partition 182 will allow fluid to pass therethrough but will not be blown into either the reactor compartment 178 or the condenser compartment 176.

A lower partition 188 extends horizontally from the reactor container 154 to a junction between the upper portion 170 and lower portion 172 of the inner wall 168. The lower partition 188 also has two membranes 192 mounted thereon with an inner space 194 therebetween forming an air space or an evacuated region. Each membrane 192 is secured at its inner and outer peripheries to the inner wall 168 and to the reactor container 154, respectively. In this instance, each membrane 192 has a weakened portion midway between its inner and outer peripheries and functions in a similar manner to the weakened portion described above for the upper partition 182. Of course, two-way swinging doors similar to the doors described with reference to FIG. 1 may be used in upper partition 182 and lower partition 188. In this event the doors in the upper partition are hinged at the reactor container 154 and open at the inner wall 168. The doors used in the lower partition 188 can be of a double door type, which open at the mid-point between the inner wall 168 and the reactor container 154 and are hinged at the inner wall 168 and at the reactor container 154.

Within the loop compartment 174 and below the condenser compartment 176 there is disposed an annular liquid receiver 196, which has a generally triangular cross section with a trough 198 at the bottom thereof. The liquid receiver 196 is open at the top and has a plurality of inwardly opening doors 200. The doors 200 have stop means thereon (not shown) which prevent the doors from opening inwardly beyond a horizontal position. Spray heads 68, which are located in the reactor compartment 178 and the loop compartment 174 are coupled to the trough 198 by conduits 202 and ring header 204. Means, such as orifices or differently sized conduits, are provided to equalize the pressure drop between the trough 198 and each spray header 68. Thus, the flow of liquid through each spray head 68 will be substantially equal.

If a rupture occurs in conduit 38 within the reactor compartment 178, the escaping fluid from the conduit 38 creates a pressure within the reactor compartment 178. The pressure build up causes the upper partition 182 to sever at the top of the inner wall 168 and to be blown inwardly into the condenser compartment 176 with one end of the upper partition 182 remaining secured to the reactor container 154. The escaping fluid enters the condenser compartment 176 and flows downwardly through an ice bed 98', which is disposed within the condenser compartment 176 and may be similar in construction to the ice bed 98 described with reference to FIG. 1. The fluid is condensed by virtue of the heat absorption of the melting ice bed 98'. The mixture of water from the melting ice and of fluid condensate flows through the lower partition 188 which has ruptured at its center from the weight of the water and condensate accumulating on the lower partition 188 or from a pressure buildup within the condenser compartment 176. The mixture of condensate and water then falls into the liquid receiver 196, flows through the conduits 202 and/or ring header 204 into the spray heads 68, and is sprayed into the reactor compartment 178 and the loop compartment 174. The mixture sprayed into the reactor compartment 178 falls directly into the well 164, and the mixture sprayed into the loop compartment 174 drops to the bottom thereof and flows by gravity through the flow passages 180 into the well 164. Non-condensable fluids, in turn, are accumulated within the loop compartment 174.

If a rupture occurs in the conduit 38 within the loop compartment 174, the escaping fluid or steam develops a pressure within the loop compartment 174 causing the doors 200 to open into the liquid receiver 196 thereby allowing the steam to enter and pressurize the liquid receiver 196. The pressure ruputures the lower partition 188 permitting the steam to enter the condenser compartment 176. The steam is then condensed by the ice bed 98'. The melted ice and condensate mixture falls through the escaping steam entering the condenser compartment 176 to the bottom of the liquid receiver 196 and flows through the spray heads 68 and then into the well 164, as previously described. In the meantime the non-condensable gases are accumulated in the upper portion of the condenser compartment, and the pressure in the upper portion of the condenser compartment is increased by the additional steam entering the condenser compartment 176 rupturing partition 182 and permitting the non-condensables to enter the reactor compartment 178 for storage thereof.

If desired, the lower portion 172 of the inner wall 168 can be omitted to provide a large opening between the reactor compartment 178 and the loop compartment 174. In this case the steam escaping from a rupture at any location in the conduit 38 causes either the lower partition 188 or the upper partition 182 to rupture first, or cause simultaneous rupture of both partitions. Therefore, the steam flow can be upwardly through the condenser compartment 176, or downwardly through the condenser compartment 176, or can enter the condenser compartment 176 simultaneously from above and below. It is also understood that, if desired, either the liquid receiver 196 or the lower partition 188 may be omitted.

Of course, the spray sump pump system and the emergency pumping system described previously with reference to FIG. 1 may also be incorporated into this embodiment of the invention shown in FIG. 11 in a similar manner to that described with reference to FIG. 1.

Referring now to FIG. 12, there is shown therein another embodiment of this invention. A reactor container 206 is shown which is similar in construction to the reactor container 154 shown in FIG. 11, except that the well 164 of FIG. 11 has been omitted. The reactor vessel 30, the steam generator 34, the reactor pump 36, and the reactor shield 166 are disposed within the reactor container 206 in a similar manner as previously described with reference to FIG. 11. Disposed outside of the reactor container 206 is a condenser compartment 208 which has a toroidal shape. The condenser compartment 208 is communicably coupled to the reactor container 206 by a plurality of conduits 210. An insulated door 212, which swings inwardly into conduit 210, is provided at the reactor container end of each conduit 210; and an ice bed 98'' is provided in the upper portion of the condenser compartment 208. If desired, the insulated doors 212 may be omitted. Cooling coils 82 are provided within the condenser compartment 208 and surround the ice bed 98''. The condenser compartment 208 is made sufficiently large to accommodate within its lower portion all of the condensate formed from the escaping steam, all of the water formed from the melting ice, and all of the non-condensable fluids.

In operation a rupture in one of the conduits 38 within the reactor container 206 allows steam to escape into the reactor container. As the pressure builds up within the reactor container 206, the insulated doors 212 are forced open thereby allowing the escaping steam to pass through the conduits 210 into the condenser compartment 208. The steam passes through the ice bed 98'' and is condensed. The condensate and melted ice mixture falls to the bottom of the condenser compartment 208 and is permitted to accumulate to a predetermined level, for example the level depicted by the dot-dash line 214. The non-condensables, on the other hand, are stored between the ice bed 98'' and the surface of the liquid mixture collected at the bottom of the condenser compartment 208.

If use of a spray system within the reactor container 206 is desired, a spray supply pump 218, having an inlet conduit 220 and an outlet conduit 222, may be provided with the inlet conduit 220 coupled to the bottom of the reactor container 206 by a conduit 224 having a valve 226 therein. The spray system is also coupled to the bottom of the condenser compartment 208 by a conduit 228 having a valve 230 therein. The pump outlet conduit 222 is coupled to a heat exchanger 232 having an inlet valve 234 and an outlet valve 236. The outlet end of heat exchanger 232 is coupled to a spray conduit 238, which penetrates the reactor container 206 and is coupled to a plurality of spray heads 68 (only one of which is shown) within the reactor container 206. A bypass conduit 240 having a valve 242 is used to bypass the heat exchanger 232 and its associated valves 234 and 236 whereby the pump outlet conduit 222 is coupled directly to the spray conduit 238. Valves 230 and 242 are normally open, while the remaining valves in the spray system are normally closed.

In operation, the liquid mixture collected at the bottom of the condenser compartment 208 during a loss-of-coolant accident within the reactor container 206 is pumped by the spray supply pump 218 from the condenser compartment 208 through conduits 228, 220, 222, 240, and 238 to the spray heads 68 from which the liquid mixture is sprayed into the interior of the reactor container 206. The liquid mixture then collects at the bottom of the reactor container 206. If the liquid mixture in the condenser compartment 208 is depleted and if further spray is desired, a liquid mixture may be obtained from the bottom of the reactor container 206 by closing valve 230 and opening valve 226 thereby supplying liquid to the pump 218 through conduit 224. If the liquid mixture within the reactor container 206 or condenser compartment 208 becomes too hot, valve 242 is closed and valves 234 and 236 are opened to cause the liquid mixture to flow through the heat exchanger 232, the latter serving to cool the liquid mixture by external cooling water (not shown) flowing therethrough. If desired, both valves 230 and 226 may be opened simultaneously to supply the pump 218 with a liquid mixture from both the reactor container 206 and the condenser 208.

The performance of the pressure suppressing system can also be improved by providing a sub-atmospheric pressure within the reactor container 206 and within the condenser compartment 208. This can be accomplished through the use of one or more exhaust or fluid pumping means such as compressor 244. The compressor 244 is coupled to the reactor container 206 and the condenser compartment 208 by inlet conduits 246 and 248, respectively. In this example, line 248 extends a short distance below the ice bed 98'' but above the line level 214, however, line 248 may be terminated above the ice bed 98''. Therefore, the air within the reactor container 206 and the condenser compartment 208 is exhausted through inlet conduits 246 and 248, through the compressor 244, and through a discharge conduit 250 to the outside atmosphere, as denoted by flow arrow 252. The air may also flow from compressor 244, through a valved conduit 262, through a suitable filter 264 in which radioactive material is removed, and finally to the atmosphere as shown by flow arrow 266. Fluids may also be exhausted from the reactor container 206 and/or condenser compartment 208 directly to the atmosphere through bypass conduit 262 and discharge conduit 250, through the filter 264, through the compressor 244 and discharge conduit 250, through the compressor 244 and the filter 264, or any desired combination of the aforementioned paths by appropriate operation of the valves of the exhaust system. Therefore, non-condensable fluids can also be exhausted to the atmosphere or to an external storage space with or without the use of the compressor 244 so as to prevent a pressure buildup by the accumulation of non-condensable gases within the reactor container 206 and the condenser compartment 208. During normal reactor plant operation one or both valves 254 and 256 are opened in combination with valves 258 and 260 to produce a vacuum within the condenser compartment 208 and/or the reactor container 206. Once the desired vacuum is obtained, both valves 254 and 256 can be closed.

The aforementioned vacuum is desirable for several reasons. First, it reduces the design pressure of the reactor container 206, as the internal pressure caused by a loss-of-coolant accident must rise to atmospheric pressure before an overpressure condition results. In fact, an overpressure condition never occurs with a sufficiently large container. Secondly, it improves the heat transfer rate between the escaping steam and the ice bed 98'', because air, which is a non-condensable gas, inhibits heat transfer between the escaping steam and the ice bed 98''. Thirdly, the storage space required for non-condensable gases may be substantially reduced or completely eliminated within the condenser compartment 208 depending upon the amount of vacuum maintained within the reactor container 206 and the condenser compartment 208. Fourthly, a vacuum or an inert gas such as nitrogen or carbon dioxide reduces the possibility of the formation of a combustible mixture which may burn or explode within the reactor container.

The following Table I lists some of the major design data for a nuclear reactor plant, and Table II compares the size of a reactor container with and without a pressure suppressing system of this invention.

TABLE I

| | | |
|---|---|---|
| Reactor power | mw.(t) | 2000 |
| Reactor coolant weight | pounds | 417,572 |
| Reactor coolant energy content | B.t.u | $2.45 \times 10^8$ |
| Design chemical energy release * | B.t.u | $0.50 \times 10^8$ |

*For example metal—water and/or hydrogen burning.

TABLE II

Description of typical reactor container with and without pressure suppressing arrangement of this invention (a) Reactor container with pressure suppressing arrangement

| | | |
|---|---|---|
| Design pressure | p.s.i.g | 30 |
| Overall container height | feet | 110 |
| Container diameter | do | 100 |

Condenser

| | | |
|---|---|---|
| Gross volume of condenser | feet³ | 100,000 |
| Weight of ice in condenser | pounds | $2.2 \times 10^6$ |
| Heat transfer area | feet² | $5 \times 10^6$ |

(b) Comparable reactor container without pressure suppressing arrangement

| | | |
|---|---|---|
| Design pressure (taken from typical large pressurized water reactor) | p.s.i.g | 48 |
| Overall container height | feet | 188 |
| Container diameter | do | 135 |

(c) Potential reactor container weight savings †, about 75%.

† Steel vessel assumed for purpose of comparison. However, other materials such as reinforced concrete, could be used with a similar savings in material.

Therefore, it is readily apparent that the size and design pressure of the reactor container is substantially reduced resulting in a substantial savings in material.

It will be appreciated that the reactor container may be made of materials such as steel and/or concrete. The primary and secondary shields may be constructed from materials such as concrete, reinforced concrete or concrete densified with barytes. Other walls and partitions within the reactor container can be made of steel or concrete or some other suitable building material. The solid material stored in the condenser compartment can be any material that has a relatively low melting point as compared to the condensation point of the fluid which results from the released coolant. For example, other materials having a relatively high heat of fusion, such as frozen ethylene glycol, can be used in lieu of the ice in the condenser bed. Mixing, turbulence, and high velocity of the fluid to be condensed will greatly improve the efficiency of heat transfer from the fluid to the solid material stored in the condenser compartment. Such variations are within the contemplation of this invention as long as the solid material stored within the condenser compartment has a sufficiently high heat of fusion and a relatively low freezing point as compared to the heat contained in and the condensation point of the gas or vapor which results from the released coolant. As previously described, the freezing point of the solid material must be such that its heat of fusion can be utilized in condensing the gas or vapor resulting from the escaping primary coolant.

It will be appreciated that a material having a relatively low ultimate strength may be substituted for one or more of the several doors or access means to the condenser compartment. For example, the doors may be formed from glass designed to shatter when subjected to a predetermined differential pressure thereacross and thereby exposing the condenser chamber to the escaping steam. Such glass doors may comprise spaced parallel sections having a vacuum therebetween to retain the heat insulation properties thereof. If desired, the entire side of the condenser compartment may be made of a material that shatters thereby exposing the entire ice bed therein upon a differential pressure buildup across the material.

The condenser compartment may also be filled with ice, in which the ice may be tightly packed or may have flow passages of various sizes therethrough to expose a sufficient amount of ice surface to the steam passing therethrough and also to regulate the steam velocity passing through the flow passages. Dry Ice may also be utilized as the solid material, whereby the heat of sublimation of the Dry Ice is utilized to condense the steam passing through the condenser compartment. Alternatively, the refrigerant coils within the condenser compartment may be located throughout the compartment. Ice may then be formed by having the water vapor in the air freeze on the coils.

In this connection further solid material may be formed on the refrigerant coils by spraying water thereon.

After the ice bed within the condenser compartment has reduced the pressure level created by the loss of coolant accident, natural circulation occurs through the condenser compartment in which the remaining portion of the ice bed is used for long term heat removal purposes resulting from a thermal energy release caused by reactor decay heat and possible chemical reactions, such as metal-water and/or hydrogen combustion. Long term heat removal may be provided by locating cooling coils, supplied by an external cooling water source, in the space where the liquid mixture of water from the melting ice and condensate are collected. Thus, the cooling coils remove heat from the collected liquid mixture prior to the movement of the mixture by the emergency sump pump and spray sump pump.

Another modification within the contemplation of this invention is to couple communicably several reactor containers or plants to a single condenser compartment. Alternatively, the condenser compartment may be located in the central region of the reactor container or may be sub-divided into sections that are dispersed in areas within the reactor container that are unoccupied by equipment and structure required by the nuclear plant.

Improvement in heat transfer may also be achieved by having a high velocity steam flow over the surfaces of the ice to enhance mixing of the steam, water, and air in the condenser compartment and to reduce the water film thickness on the ice surface.

Another variation within the contemplation of this invention is the dispersal of neutron absorbing or control material, commonly called poisons, throughout the solid material used in the condenser compartment. For example, borated water may be used to make the ice. Therefore, when the ice melts, borated water is produced and is pumped into the reactor vessel by the emergency sump pump to maintain the reactor core in a sub-critical state. Instead of boron, other poisons soluble in or transportable by water such as cadmium, silver, hafnium and mixtures thereof may be substituted.

It will be appreciated that in accordance with the invention the liquid film formed on the surface of the melting material has a temperature that remains at the freezing point of the material at all times during the melting process, thereby providing a good heat transfer relationship with the fluids being condensed or cooled. Furthermore, solid material cannot escape through leakage nor will mechanical disturbances, such as earthquakes or missiles, cause substantial harm to the heat removal capacity thereof. In addition, the use of a solid material is an economical way to provide a low temperature heat sink which is effective in reducing reactor container pressure even when the container pressure is low. The solid material may be formed from a composition which is not only a non-toxic, but also chemically inert, and may also be formed from a composition compatible with the reactor coolant. A solid material provides a large heat transfer area without necessitating the agitation required by liquid pressure suppression systems. In addition, the flow path from the reactor to the condenser compartment has a large cross sectional area, when compared with prior art systems, resulting in the minimization in the reactor container pressure in the event of a loss-of-coolant accident. With this invention the use of a material of high kinetic inertia, such as water disposed between the escaping fluid and the condenser compartment as in the case of prior art arrangements, is avoided. The flow passages through the ice bed may easily be varied in size to obtain a proper balance between the steam velocity through the ice bed and the pressure drop resulting in the ice bed.

Although the present invention has been described with reference to a nuclear reactor, it may also be used in the containment of other systems containing fluids of potentially high thermal energy release, such as chemical or process plants.

Accordingly, numerous changes may be made in the above described apparatus and different embodiments of the invention may be made without departing from the spirit thereof. It is intended that all matter contained in the foregoing description or shown in the accompanying drawings shall be interpreted as illustrative and not in a limiting sense.

What is claimed is:

1. A pressure suppressing arrangement for pressurized fluid-handling apparatus including a nuclear reactor portion from which a pressurized expansible fluid may escape comprising, a sealed containment system totally enclosing at least said nuclear reactor portion of said apparatus the interior of which is normally isolated from the interior of said fluid handling apparatus, a body of solid material disposed within said system, means for conducting escaping fluid from the interior of said fluid handling apparatus portion in the event of a rupture thereof into heat exchange relationship with said material, said solid material having the property of melting at a temperature lower than the condensation temperature of the condensable portions of said escaping fluid by absorbing heat from said escaping fluid and relying substantially entirely on the absorption of heat from the escaping fluid by the solid during heating of the solid material and during fusion thereof, the heat absorbed during fusion being the heat of fusion of the solid, the quantity of said solid material in said containment being sufficient to absorb during melting at least a substantial portion of the thermal energy of said escaping fluid to condense those condensable portions of said escaping fluid thereby reducing the pressure in said containment system.

2. The arrangement of claim 1 including means for distributing the escaping fluid through said material.

3. The arrangement of claim 1 including a collection chamber formed in said container and spaced from said body, and flow path means for conducting non-condensable gases to said chamber.

4. The arrangement of claim 1 having means for maintaining at least a portion of said containment system under a partial vacuum.

5. The arrangement of claim 1 including a liquid collection chamber spaced from said body, and means for conducting at least some of the liquid formed by the condensation of said escaping fluid and by melting of said solid material to said liquid collection chamber.

6. The arrangement of claim 5 including means for inducing the mixing of said liquid with the escaping fluid.

7. The arrangement of claim 1 wherein means are provided to define a closed compartment within said system, means for maintaining said compartment in thermally insulative relationship with the remainder of said system, said solid state material being entirely located within said compartment, and means normally isolating said compartment from the remainder of the interior of said system.

8. The arrangement of claim 7 including means for communicably coupling said compartment with the remainder of the interior of said containment system when a predetermined pressure differential between said compartment and said remainder of said system is created.

9. The arrangement of claim 8 wherein said compartment is annularly shaped and surrounds at least a portion of said nuclear reactor.

10. The arrangement of claim 8 wherein said nuclear reactor includes a reactor vessel located in said containment system, and wherein said compartment is positioned in said containment system entirely above said reactor vessel.

11. The arrangement of claim 8 wherein said coupling means comprises a plurality of secured membrane structures which break to form openings therethrough when said predetermined differential pressure is created.

12. The arrangement of claim 1 including means for directing the flow of the escaping fluid in an upwardly direction through said material whereby said melted material falls by gravity through the escaping fluid.

13. The arrangement of claim 1 wherein said sealed containment system comprises at least one nuclear reactor container, a condenser compartment external to said container having disposed therein said solid material and being normally isolated from said container, and conduit means communicably coupling said container to said compartment only when a predetermined pressure differential is created between said container and said compartment.

14. The arrangement of claim 1 wherein the escaping fluid and the melted solid state material form a liquid mixture, and including means for collecting said mixture, and means for circulating said liquid mixture through the interior of said nuclear reactor.

15. The arrangement of claim 1 including a neutron poison dispersed throughout said material.

16. A pressure suppressing arrangement for pressurized fluid-handling apparatus including a nuclear reactor portion from which a pressurized expansible fluid may escape comprising, a sealed containment system totally enclosing at least said nuclear reactor portion of said apparatus the interior of which is normally isolated from the interior of said fluid handling apparatus, a body of solid material disposed within said system, means for conducting escaping fluid from the interior of said fluid handling apparatus portion in the event of a rupture thereof into heat exchange relationship with said material, said solid material having the property of melting at a temperature lower than the condensation temperature of the condensable portions of said escaping fluid, the quantity of said solid material in said containment being sufficient to absorb during melting thereof at least a substantial portion of the thermal energy of said escaping fluid to condense those condensable portions of said escaping fluid thereby reducing the pressure in said containment system, and cooling means for maintaining said body as a solid except when exposed to said escaping fluid.

17. The arrangement of claim 16 wherein said cooling means maintains the interior of said system adjacent said body sufficiently cool to maintain at least a substantial portion of said body as a solid except when exposed to said escaping fluid.

18. A pressure suppressing arrangement for a sealed pressurized fluid-handling apparatus including a nuclear reactor portion from which a pressurized expansible fluid may escape comprising, a sealed containment system totally enclosing at least said nuclear reactor portion of said apparatus the interior of which is normlly isolated from the interior of said fluid handling apparatus, a body of ice disposed within said system, means for conducting escaping fluid from the interior of said fluid handling apparatus portion in the event of a rupture thereof into heat exchange relationship with said ice, said system containing a sufficient quantity of ice to absorb upon the melting thereof at least a substantial portion of the thermal energy of said escaping fluid to condense those condensable portions of said escaping fluid thereby reducing the pressure in said containment system.

19. The arrangement of claim 18 having means for maintaining the interior of said containment system under a partial vacuum.

20. The arrangement of claim 18 including means for maintaining at least a substantial portion of said body of ice as a solid except when exposed to said escaping fluid.

21. The arrangement of claim 18 wherein said ice is formed with a plurality of flow passageways therethrough.

22. The arrangement of claim 18 wherein said ice comprises a plurality of discrete ice pellets.

23. The arrangement of claim 22 wherein each of said ice pellets is formed with a flow passageway extending therethrough.

24. A pressure suppressing arrangement for pressurized fluid-handling apparatus including a nuclear reactor portion from which a pressurized expansible fluid may escape comprising, a sealed containment system totally enclosing at least said nuclear reactor portion of said apparatus the interior of which is normally isolated from the interior of said fluid handling apparatus, a body of solid material disposed within said system, means for conducting escaping fluid from the interior of said fluid handling apparatus portion in the event of a rupture thereof into heat exchange relationship with said material, said solid material having the property of melting at a temperture lower than the condensation temperature of the condensable portions of said escaping fluid by absorbing heat from said escaping fluid and relying substantially entirely on the absorption of heat from the escaping fluid by the solid during fusion thereof, the heat absorbed during fusion being the heat of fusion of the solid, the quantity of said solid material in said containment being sufficient to absorb during melting at least a substantial portion of the thermal energy of said escaping fluid to condense those condensable portions of said escaping fluid thereby reducing the pressure in said containment system, and means for maintaining a predetermined inventory of said solid material within said containment.

25. A method for suppressing pressure in a nuclear reactor sealed containment system produced by the escape of fluid from a nuclear reactor disposed within the containment system comprising the step of condensing at least a portion of said escaping fluid by the heat of fusion of a solid material disposed within the sealed containment system having a lower freezing temperature than the condensation temperature of said fluid portion and normally maintaining said material as a solid.

References Cited

UNITED STATES PATENTS

| | | | |
|---|---|---|---|
| 1,908,290 | 5/1933 | Goosmann | 62—119 |
| 1,990,219 | 2/1935 | Baird | 62—119 |
| 2,073,700 | 3/1937 | Keilholtz | 62—331 |
| 3,022,238 | 2/1962 | Kolflat | 176—37 |
| 3,028,327 | 4/1962 | Weeks | 176—37 |
| 3,052,615 | 9/1962 | Johns et al. | 176—37 |
| 3,115,450 | 12/1963 | Schanz | 176—37 |
| 3,158,546 | 11/1964 | Cordova | 176—37 |
| 3,253,996 | 5/1966 | Bond et al. | 176—37 |
| 3,258,403 | 6/1966 | Malay | 176—37 |

FOREIGN PATENTS

Ad. 73,964 10/1960 France.

REUBEN EPSTEIN, *Primary Examiner.*

U.S. Cl. X.R.

62—79, 331; 165—2